United States Patent
Kubo

(10) Patent No.: US 8,300,756 B2
(45) Date of Patent: Oct. 30, 2012

(54) INTERMITTENT OPERATIVE COMMUNICATION APPARATUS ADAPTIVELY CONTROLLING THE TIMING OF WAITING DATA RECEPTION AND A METHOD THEREFOR

(75) Inventor: Yuki Kubo, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 919 days.

(21) Appl. No.: 12/379,579

(22) Filed: Feb. 25, 2009

(65) Prior Publication Data

US 2009/0213970 A1  Aug. 27, 2009

(30) Foreign Application Priority Data

Feb. 26, 2008  (JP) ................................. 2008-044729

(51) Int. Cl.
H04L 7/00  (2006.01)

(52) U.S. Cl. ........ 375/356; 375/354; 375/357; 375/358; 375/359; 375/364; 375/371

(58) Field of Classification Search ................. 375/354, 375/357, 358, 359, 364, 371; 327/141; 358/409, 358/424; 370/503
See application file for complete search history.

(56) References Cited

U.S. PATENT DOCUMENTS

| | | | |
|---|---|---|---|
| 5,301,225 A | 4/1994 | Suzuki et al. | |
| 6,507,571 B1 | 1/2003 | Yamamoto | |
| 7,912,033 B2 * | 3/2011 | Heidari-Bateni et al. | .... 370/350 |
| 2006/0133408 A1 | 6/2006 | Nogueira-Nine et al. | |
| 2006/0187866 A1 | 8/2006 | Werb et al. | |
| 2012/0008626 A1 * | 1/2012 | Brederveld et al. | ........... 370/392 |

FOREIGN PATENT DOCUMENTS

| | | |
|---|---|---|
| EP | 1657852 A1 | 5/2006 |
| JP | 5-183487 A1 | 7/1993 |
| JP | 11-27180 | 1/1999 |
| JP | 2006-148906 | 6/2006 |
| WO | WO 2006/097177 A1 | 9/2006 |

OTHER PUBLICATIONS

Shakya, M. et al., "Design and Optimization of Wireless Sensor Network With Mobile Gateway", Advanced Information Networking and Applications Workshops, 2007, AINAW '07, 21st International Conference on IEEE, Piscataway, NJ, USA, May 21, 2007, pp. 415-420.

Vasanthi, N. et al., "Energy Efficient Sleep Schedule for Achieving Minimum Latency in Query bases Sensor Networks", Sensor Networks, Ubiquitous, and Trustworthy Computing, 2006, IEEE International Conference on Taichung, Taiwan, Jun. 5-7, 2006, Piscataway, NJ, IEEE, vol. 2, Jun. 5, 2006, pp. 214-219.

(Continued)

Primary Examiner — Dhaval Patel
(74) Attorney, Agent, or Firm — Rabin & Berdo, P.C.

(57) ABSTRACT

An intermittent operative communication apparatus can send data, received from a source communication device, to any receiver communication device at a predetermined interval and wait for receiving data at the predetermined interval. The communication apparatus has a selector for selecting one or multiple receiver communication devices as a reference communication device that gives a reference timing at which the communication apparatus waits for receiving data, and a timing controller for setting a timing, at which the communication apparatus waits for receiving data, to a timing according to operation of any reference communication device.

18 Claims, 7 Drawing Sheets

OTHER PUBLICATIONS

Xiaolei, Shi et al., "SyncWUF: An Ultra Low-Power MAC Protocol for Wireless Sensor Networks", IEEE Transactions on Mobile Computing, IEEE Service Center, Los Alamitos, CA, vol. 5, No. 1, Jan. 1, 2007, pp. 115-125.

En-Yi A. Lin, et al., "Power-Efficient Rendez-vous Schemes for Dense Wireless Sensor Networks", IEEE International Conference on Communications 2004, Paris, France, Jun. 2004, referred to in paragraphs 0002 and 0003 of the description.

* cited by examiner

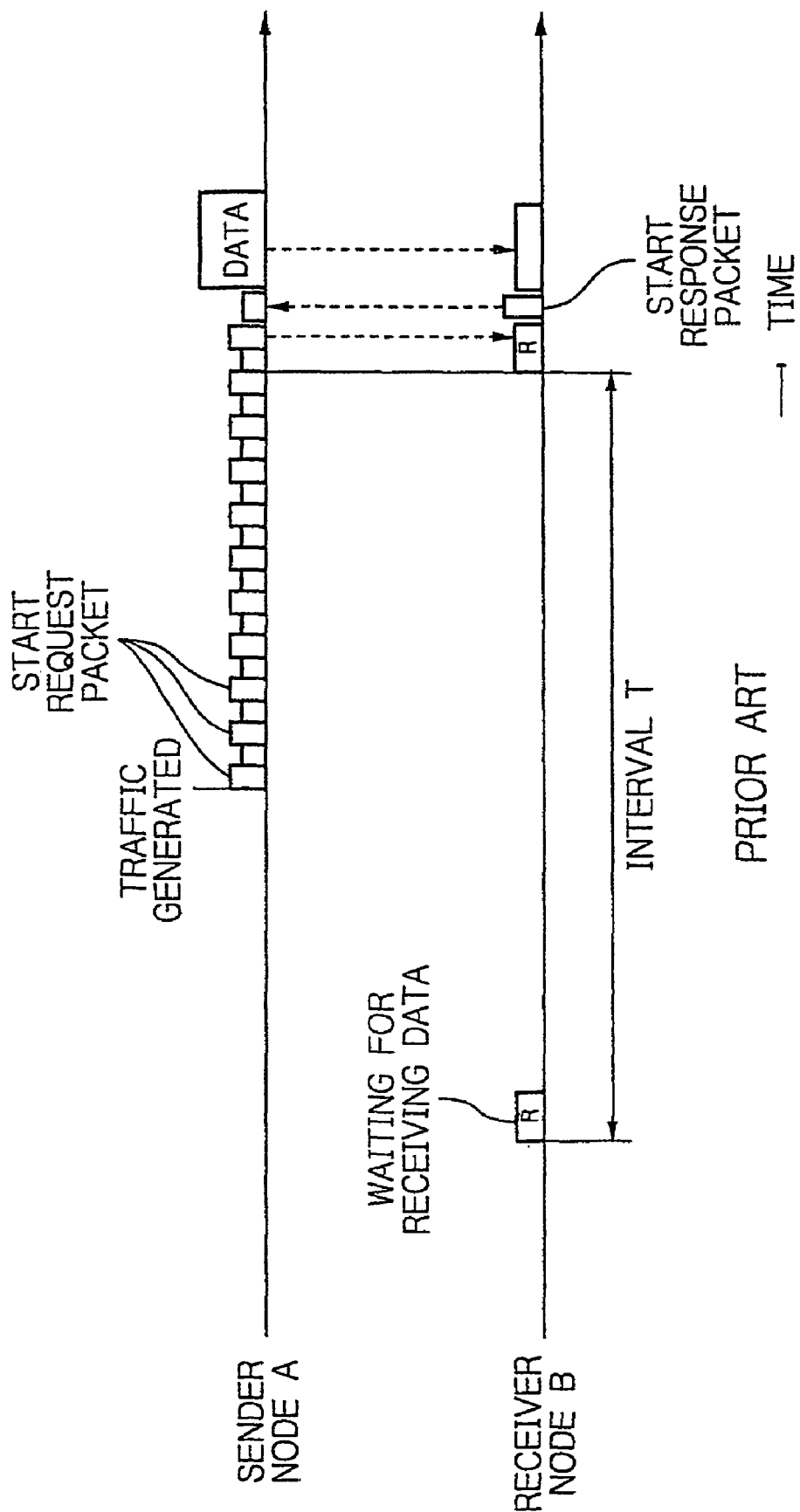

INTERMITTENT OPERATIVE COMMUNICATION APPARATUS ADAPTIVELY CONTROLLING THE TIMING OF WAITING DATA RECEPTION AND A METHOD THEREFOR

BACKGROUND OF THE INVENTION

1. Field of the Invention

The present invention relates to an intermittent operative communication apparatus and a method therefor, and more particularly to an intermittent communication apparatus for use in a telecommunications network, such as a sensor network, formed by a plurality of wireless communication nodes located spatially apart from each other to perform data communication with each other via wireless transmission.

2. Description of the Background Art

For a plurality of wireless communication nodes performing data communication with each other via wireless transmission media, a communication method with intermittent operation is researched and developed in which, for power saving, a device not regularly used is turned off so as to intermittently operate. A communication scheme with intermittent operation is taught by En-Yi A. Lin, et al., "Power-Efficient Rendez-vous Schemes for Dense Wireless Sensor Networks", IEEE International Conference on Communications 2004, Paris, France, June 2004.

First with reference to FIG. 8, the communication method disclosed by Lin, et al., will be described. The method taught by Lin, et al., is to regularly power on a wireless device only for a short period of time to wait for reception of a signal, and, for the remaining period of time, to power off the wireless device, thus contemplating power saving. In the context, the timing for such a regular waiting for signal reception is called sniff timing.

In order to transmit a data packet to a wireless node that performs power saving operation with the above way of intermittent reception, a packet has to be transmitted in time with a short reception waiting interval. It is however difficult to identify such timing from external nodes. The system is thus adapted to consecutively transmit control packet for start requests when a send packet is generated. Such consecutive transmission of start packets may cause one of the start packets to be received by a destination node sooner or later at its reception wait timing. In response to the start request, the receiving node will return a start response to thereby notify the sending node of having entered its reception waiting state. The sending node will, after having received the start response, transmit the data packet. Thus, the sending state can normally be established. This scheme is called the power saving listening, a very simple way to accomplish an effective power saving.

However, in the method disclosed by Lin, et al., if the nodes operate at the operational interval T and randomly determine the sniff timing thereof, then control packet for start requests when sending a data packet to some node will be transmitted consecutively at the timing, which is averaged to a value of T/2. This means that packets are relayed with a delay caused which is in average equal to the interval of T/2. For effective power saving, some length of operational interval T is required. However, the longer operational interval, the longer delay. Thus, in an application having the delay restricted, a longer operational interval is not allowed, causing a problem that the power saving cannot fully be effected.

SUMMARY OF THE INVENTION

It is therefore an object of the invention to provide an intermittent operative communication apparatus and a method therefor in which delay in data transmission is minimized without deteriorating the advantages of intermittent reception.

In accordance with the present invention, an intermittent operative communication apparatus for use in a telecommunications system including a plurality of communication devices waits for receiving data at a predetermined interval and sending data received from a source device among the plurality of communication devices to a receiver device among the plurality of communication devices, the receiver device waiting for data at the predetermined interval. The apparatus is specifically featured by adaptively controlling or changing a timing for waiting for receiving data. The apparatus comprises: a selector for selecting at least one of the plurality of communication devices as a reference device giving a reference timing with reference to which the apparatus waits for receiving data; and a timing controller for setting a timing at which the apparatus waits for receiving data to a timing according to operation of the reference device.

Also in accordance with the present invention, a telecommunications system comprises a plurality of communication devices, the devices waiting for receiving data at a predetermined interval and sending data received from a source device among the plurality of communication devices to a receiver device among the plurality of communication devices, the receiver device waiting for data at the predetermined interval. At least one of the plurality of devices is operative intermittently and comprises the selector and the timing controller stated above.

Further in accordance with the present invention, a communication method is provided in an intermittent operative communication apparatus for use in a telecommunications system including a plurality of communication devices, the apparatus waiting for receiving data at a predetermined interval and sending data received from a source device among the plurality of communication devices to a receiver device among the plurality of communication devices, the receiver device waiting for data at the predetermined interval, the apparatus including a selector and a timing controller. The method comprises the steps of: selecting by the selector at least one of the plurality of communication devices as a reference device for controlling a reference timing with reference to which the apparatus waits for receiving data; and setting by a timing controller a timing at which the apparatus waits for receiving data to a timing according to operation of the reference device.

Thus, in accordance with the present invention, an intermittent operative communication apparatus, a communication system and a communication method may be provided which allow delay in data transmission to be reduced without deteriorating the advantages of intermittent reception.

BRIEF DESCRIPTION OF THE DRAWINGS

The objects and features of the present invention will become more apparent from consideration of the following detailed description taken in conjunction with the accompanying drawings in which:

FIG. 8 is a timing chart useful for understanding an operation when traffic is generated, according to a traditional intermittent operative communication method.

DESCRIPTION OF THE PREFERRED EMBODIMENTS

Illustrative embodiments of an intermittent operative communication apparatus according to the present invention will be described below with reference to the accompanying drawings. In the illustrative embodiments, a wireless, e.g. radio, communication system is formed by a plurality of intermittent operative communication apparatus which are located in a service area spatially apart from each other.

Figure 1:
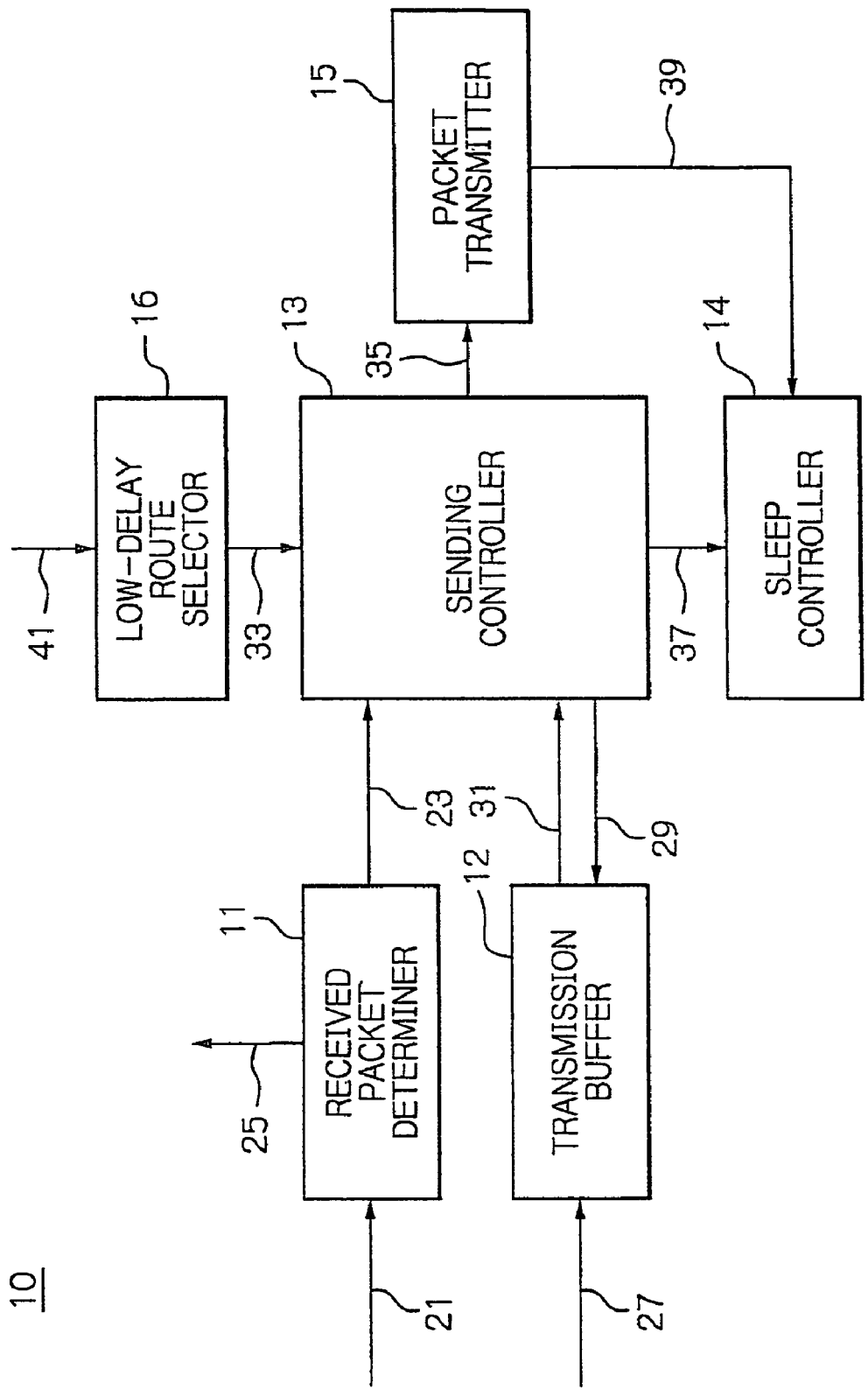
FIG. 1 is a schematic block diagram illustrating the internal functional structure of a preferred embodiment of an intermittent operative communication apparatus acting as a communication node in accordance with the present invention.
Figure 2:
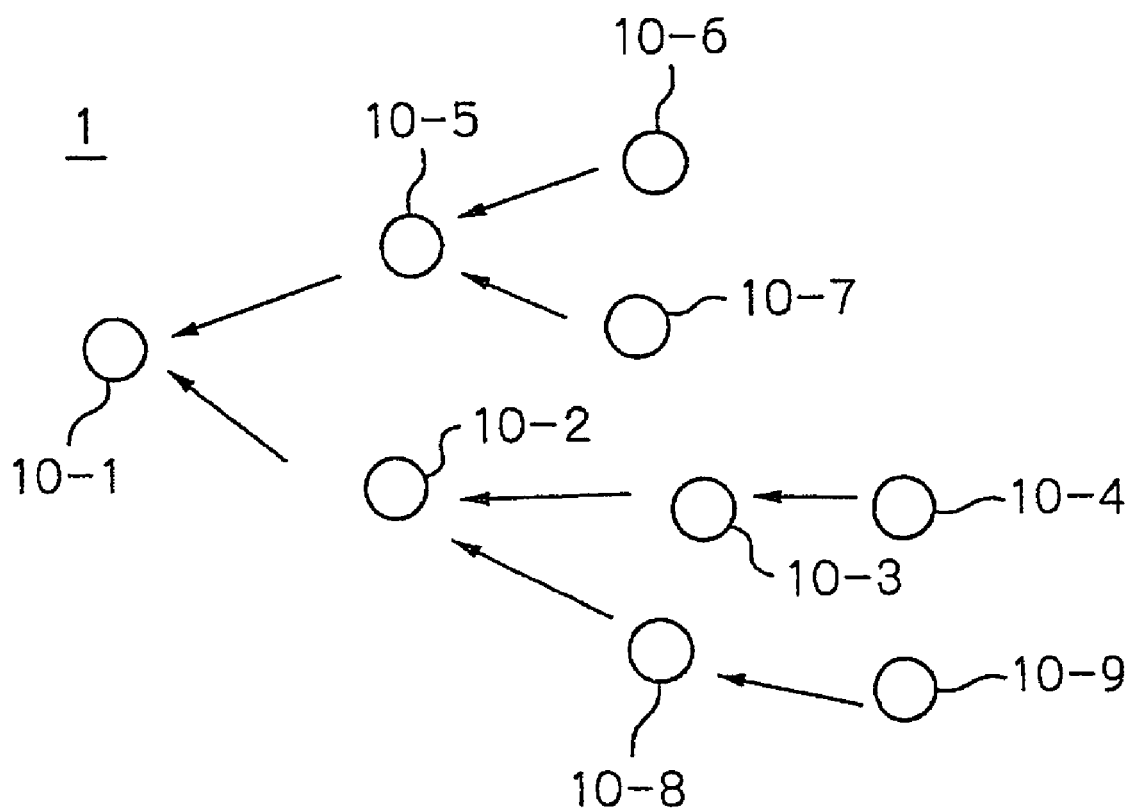
FIG. 2 shows an example of overall structure of communication system to which applicable is the illustrative embodiment of the intermittent operative communication apparatus shown in FIG. 1.

FIG. 2 shows the overall structure of a communication system 1 according to the illustrative embodiment. FIG. 1 is a schematic block diagram of the internal functional structure of node according to the embodiment. Reference will be made first to FIG. 2, in which a communication system 1, which may be a wireless sensor network, includes at least nine wireless communication nodes 10-1 to 10-9, which may sometimes be generally designated with a single reference numeral 10.

Those nodes 10-1 to 10-9 may have the internal structure similar to each other and carry out a wireless communication while being intermittently operative. Those nodes 10, to which the intermittent operative communication apparatus is applied according to the invention, are implemented by a processor system which has control programs, data or the like installed to accomplish intermittent operation of wireless communication. Such a processor system may include a single device or devices in the form of multiple units but not specifically limited thereto, and have its configuration appropriate for executing such programs, such as CPU (Central Processor Unit), ROM (Read-Only Memory), RAM (Random-Access Memory), EEPROM (Electrically Erasable and Programmable ROM) and hard disk, as well as the interface for communication with other communication devices. The configuration may functionally be depicted as what is shown in FIG. 1.

In the illustrative embodiment, the communication system 1 has a network topology, i.e. connection mode, of nodes 10-1 to 10-9, connected in a tree as shown in FIG. 2. In the figure, on the top layer of the tree, the node 10-1 is located. Below the node 10-1, for example, the node 10-2 is located, below which, the node 10-3 is located, below which the node 10-4 is located.

With reference to FIG. 1, the node 10, which may be either of the nodes 10-1 to 10-9, includes a wireless, e.g. radio, communication device which is comprised of a received packet determiner 11, a transmission buffer 12, a sending controller 13, a sleep controller 14, a packet transmitter 15 and a low-delay route selector 16, which are interconnected as illustrated.

The received packet determiner 11 is adapted to identify a control packet relating to power saving communication among packets 21 received from another node 10 other than itself to provide the control packet 23 to the sending controller 13 and also provides the remaining packets, data packets, 25 to the upper layer processing, e.g. application and relay processing layer, not shown, in the node 10. In the application, signals are designated with the reference numerals of connections on which they are conveyed.

Such control packets 23 dealt with by the received packet determiner 11 include a control packet for start request and a control packet for start response. The control packet for start request is to activate a destination node when being in its sleep state so as to promote the latter to move to its active state. The control packet for start request has information set, such as an identification (ID) indicating that the packet is a control packet for start request and the addresses of a source and a destination node associated with the start request. The control packet for start response is used for responding to the source node by indicating that the node 10, when having received a control packet for start request, moves to its active state. The control packet for start response has information set, such as an identification indicating that the packet is of a start response, and the addresses of a destination and a source node of the start response.

The transmission buffer 12 is adapted to receive a data packet 27 from the upper layer processing, such as an application and a relay processing, in the node 10, and to buffer the data packet 27 therein. The buffer 12 is operative in response to a request 29 from the sending controller 13 to transfer the data packet 31 thus buffered to the sending controller 13.

The sending controller 13 functions as controlling, when receiving a control packet 23 for start request from the received packet determiner 11, the packet transmitter 15 to send a control packet for start response, responsive to the control packet for start request, to the source node of the control packet for start request. The sending controller 13 takes out, when a control packet 23 for start response is received from the received packet determiner 11, a data packet 31 from the transmission buffer 12, and transfers the latter on a connection 35 to the packet transmitter 15, which is then controlled to send the data packet to the destination node 10.

If the sending controller 13 receives a control packet 23 for start response, the controller 13 compares the source address of the control packet for start response with a destination address 33 which the low-delay route selector 16 specifies as a destination with low delay, as will be described later on. If the source address of the control packet for start response is the same as the destination address with low delay 33, then the controller 13 sets the value of the next sniff timing to $Tr+T-\Delta t$, and notifies the sleep controller 14 of that value over a connection 37, where Tr denotes the current value of a timer, not shown, included in the controller 13, T the time interval of the regular sniffing operation, and $\Delta t$ a period of time consumed, for example, from the node 10 starting the reception waiting and then receiving data from another node 10 until the node 10 further sending to the other node 10 a control packet for start request for transferring the data to the other node 10. The time period $\Delta t$ has to be sufficient in length for sending, for example, control packets for start request several times, a control packet for start response, a data packet and an ACK (acknowledgment) packet.

As described above, the sending controller 13 sets the sniff timing of the node 10 to a value which is equal to Δt [second] before the sniff timing of a destination node.

The sending controller 13, if a data packet has been stored in the transmission buffer 12, waits until the sniff timing of node 10 elapses, and sends a control packet 35 for start request to packet transmitter 15. The packet transmitter 15 is so controlled that, once it starts sending a control packet for start request, it continuously sends control packets for start request until it receives a start response or a specified time period elapses to time out. If the continuous transmission of control packets for start request is timed out, back-off processing may be taken such as to wait for a random duration elapsing and thereafter starting the retransmission of control packets for start request.

The sleep controller 14 serves as powering on the wireless section of the device 10 once during the time interval T to thereby enter the state of waiting for signal reception, and otherwise either powering off the wireless section or entering the power saving state, which may be lower in electric power consumption than the power-on state but higher than the power-off state, thus repeating the state of waiting for signal reception and either the power-off state or the power saving state. In the power saving state, signal reception is waited for in the period of 4 ms once in the duration of 1000 ms, for example. In operation, if the sleep controller 14 receives a sniff timing control over the connection 37 from the sending controller 13, it changes the timing for the next reception waiting to the timing specified by the sending controller 13. When the packet transmitter 15 sends a packet, the sleep controller 14 receives a start request on the connection 39 and in turn powers on the wireless section of the device 10 so as to allow a packet to be transmitted.

The packet transmitter 15 functions as transmitting a packet 35 received from the sending controller 13 via its wireless communication section. When transmitting a packet, the transmitter 15 transfers to the sleep controller 14 a start request 39 for turning on the power of the wireless section of the device 10, thereby being able to transmit a packet irrespective of having been in sleeping.

The low-delay route selector 16 is operative in response to information provided on a connection 41 from a route selector, not shown, for a multi-hop communication select a destination node with low delay. In the method called cluster tree routing as used in the ZigBee, trademark, for example, each node has a unique mother node, so that such a mother node may be selected as a destination with low delay. The low-delay route selector 16 according to the instant embodiment defines, as understood from the tree-structure network shown in FIG. 2, the information on the mother node 10 positioned one layer above the node 10 of interest as a destination with low delay so that a transfer route to the upper layer node on the tree is selected as a low-delay route.

The operation of the wireless communication system 1 will be described according to the illustrative embodiment having the structure described above. At first, the operation of sending a packet from the node 10-3 to the node 10-2 will be described. Then, the operation of sending a packet from the node 10-4 to the node 10-1 via the nodes 10-3 and 10-2 will be described.

Figure 3:
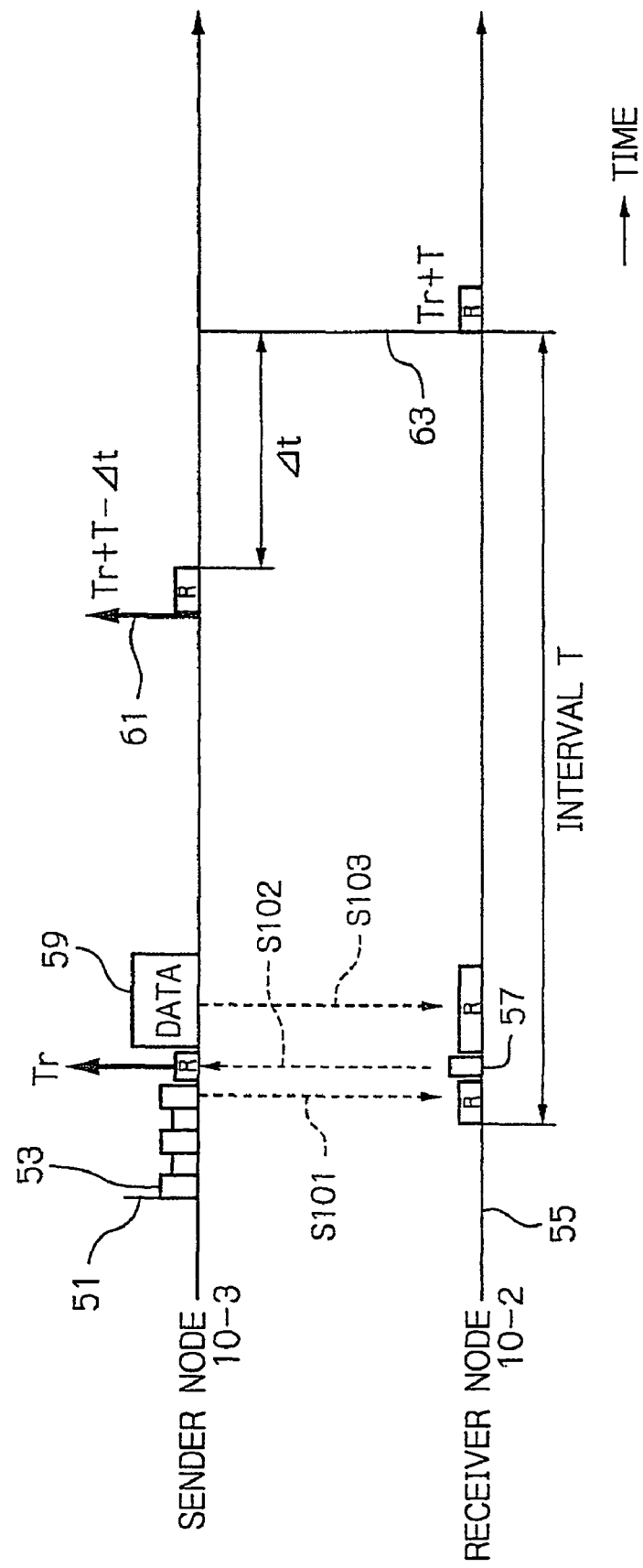
FIG. 3 is a timing chart useful for understanding an example of operation to send and receive data between two nodes according to the illustrative embodiment.

FIG. 3 is a timing chart for illustrating an exemplified operation in which data is sent and received between the two nodes 10-2 and 10-3. Specifically in the sequence shown in FIG. 3, an operation will proceed to transmitting a packet is sent from the sender node 10-3 to the receiver node 10-2. Thus in the context, the nodes 10-3 and 10-2 are referred to sender and receiver nodes, respectively.

If the sender node 10-3 produces a data packet to be sent, i.e. traffic 51 is generated, for example, when having received a packet sent from the node 10-4 and meant for the node 10-1, the transmission buffer 12 of the sender node 10-3 stores the data packet therein. In the following, the components of a specific node will be designated with the reference numeral of those components with the number of that node hyphenated, such as "buffer 12-3" stated above. The sending controller 13-3 then confirms that the transmission buffer 12-3 stores data packets and also when the sniff timing elapses on the wireless communication device of that sender node 10-3, which will be referred to as "own node", the device of the own node being referred to as "own device". The sending controller 13-3 in turn controls the packet transmitter 15-3 to send a control packet for start request 53 to the receiver node 10-2 which is to relay that data packet produced as a provisional destination. The sending operation will be repeated until the receiver node 10-2 returns a start response to the control packet for start request or the processing is timed out.

On the other hand, the receiver node 10-2 is regularly in its sleep state 55 of its wireless section under the control of to the sleep controller 14-2. Upon the receiver node 10-2 being regularly brought into its reception waiting state under the control of the sleep controller 14-2, the node 10-2 will be able to receive a control packet for start request, which is continuously sent from the sender node 10-3 in this example, as shown by the step S101.

Then, in the receiver node 10-2, the received packet determiner 11-2 delivers a control packet for start request 53 received from the sender node 10-3 to the sending controller 13-2. The sending controller 13-2 in turn controls the packet transmitter 15-2 so as to return a control packet for start response 57 responsive to the control packet for start request 53 from the sender node 10-3 to the sender node 10-3 (S102), as depicted with a time Tr.

At the time Tr, the sender node 10-3 then receives from the receiver node 10-2 the control packet for start response 57, and in turn stops the continuous transmission of the control packet for start request 53. The sender node 10-3 then sends a data packet 57 to the receiver node 10-2, thus completing the data packet transmission processing (S103). In this example, data packets are simply sent. However, the receiver node 10-2 may subsequently return an acknowledgment (ACK) packet which indicates the packet reception completed. Data may of course be sent in the form of multiple packets.

More specifically in the above-described step S102, in the sender node 10-3, when having received the control packet for start response 53 from the receiver node 10-2, the low-delay route selector 16-3 selects a low-delay route based on the upper layer processing. In this example, the receiver node 10-2 is a mother node of the sender node 10-3 so that the low-delay route selector 16-3 of the sender node 10-3 specifies the receiver node 10-2, the mother node, as a destination address with low delay. Then, the destination address with low delay thus determined is compared with the source address of the start response. In this exemplified case, the sending controller 13-3 determines that the destination address with low delay specified by the low-delay route selector 16-3 is coincident with the source address of the start response in the step S102 such that both are one and the same address of the receiver node 10-2. Thus, in order to minimize the delay in transmission to the receiver node 10-2, the sending controller 13-3 calculates the next sniff timing by means of the above-described method so that the next sniff timing 61 is set to a value equal to Tr+T−Δt, and then requests the sniff timing control for the sleep controller 14-3.

As described above, the sender node 10-3 sets the next sniff timing. Then, for example, if the sender node 10-3 again a packet, which was sent from the node 10-4 toward the node 10-1, then an expected sniff timing 63 of the receiver node 10-2 will be generated when the time period of Δt elapses since the sniff timing 61 of the sender node 10-3, the value of Δt corresponding to the transmission time of one hop.

Figure 4:
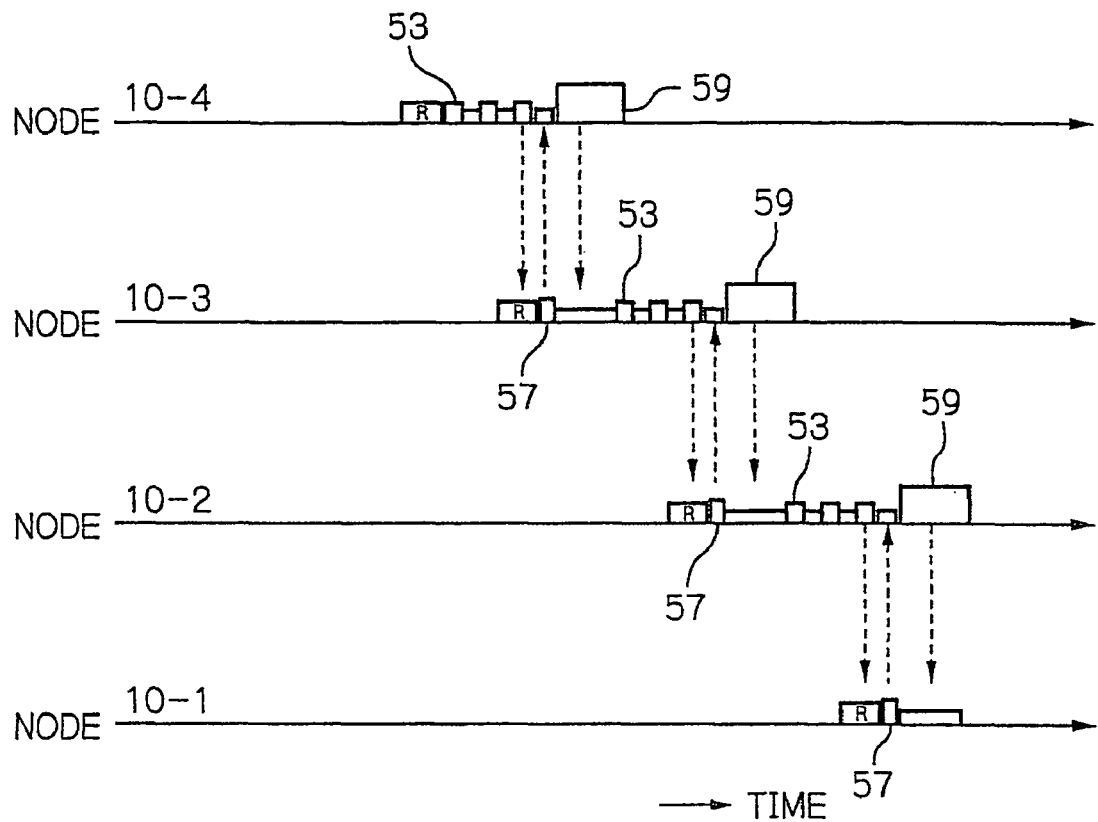
FIG. 4 is also a timing chart useful for understanding an example of operation to transmit a packet from a source node according to the illustrative embodiment via two nodes to a destination.

FIG. 4 is a timing chart for use in illustrating an exemplified operation in which a packet is sent from the source node 10-4 to the destination node 10-1 by way of the two nodes 10-3 and 10-2. In the example shown in FIG. 4, the operation proceeds to transferring a packet from the node 10-4 to the node 10-1 via the nodes 10-3 and 10-2.

Whenever each of the nodes 10-1 to 10-4 relays a packet, the same operation as FIG. 3 will be executed. More specifically, the sniff timing in each of the nodes 10-2, 10-3 and 10-4 is set to a value advanced by the value of Δt from that of the respective mother nodes, and the sniff timing in the nodes 10-1 to 10-4 changes stepwise as shown in FIG. 4, and a packet generated in the node 10-4 is sent with a delay per hop substantially equal to about Δt.

According to the instant embodiment, the following advantages are achieved. According to the prior art as taught by Lin, et al., in which a packet is relayed in a multi-hop manner, control packets for start request must be sent for a long time until reaching the sniff timing of the destination node. By contrast, according to the instant illustrative embodiment, when sending a packet to a specific node 10, which is selected by the low-delay route selector 16 as a low-delay route destination, the sniff timing of the node 10 is controlled so that a control packet for start request may be sent to the destination node for a duration Δt to form the sniff timing of the destination node, thus significantly reducing a delay, which would otherwise be caused by relaying, as in then example in the FIG. 4. For example, in the traditional network exemplified as shown in FIG. 4, a packet is relayed from the node 10-4 to the node 10-1 in a multi-hop fashion, causing a transmission delay per hop corresponding in average to a value of T/2, which reduces to a value of Δt according to the illustrative embodiment.

The present preferred embodiment is able to also shorten a period of time consumed in the repeated transmission of control packets for start request to the destination node 10, thus effectively accomplishing the power saving. For example, as shown in the FIG. 2, where in the tree-structure network an upward direction traffic, e.g. traffic from the node 10-4 to the node 10-1, the destination of each node 10 is simply determined to single, thus being significantly advantageous.

An alternative embodiment of intermittent operative communication apparatus according to the invention will be described below referring to further accompanying drawings. The intermittent operative communication apparatus is also applicable to a telecommunications node according to the alternative embodiment, which may be a wireless sensor network, for example.

Figure 5:
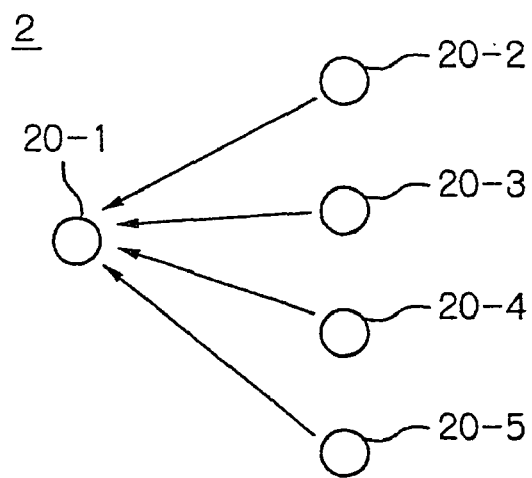
FIG. 5 shows, like FIG. 2, an example of overall structure of a communication system according to an alternative embodiment of the invention.
Figure 6:
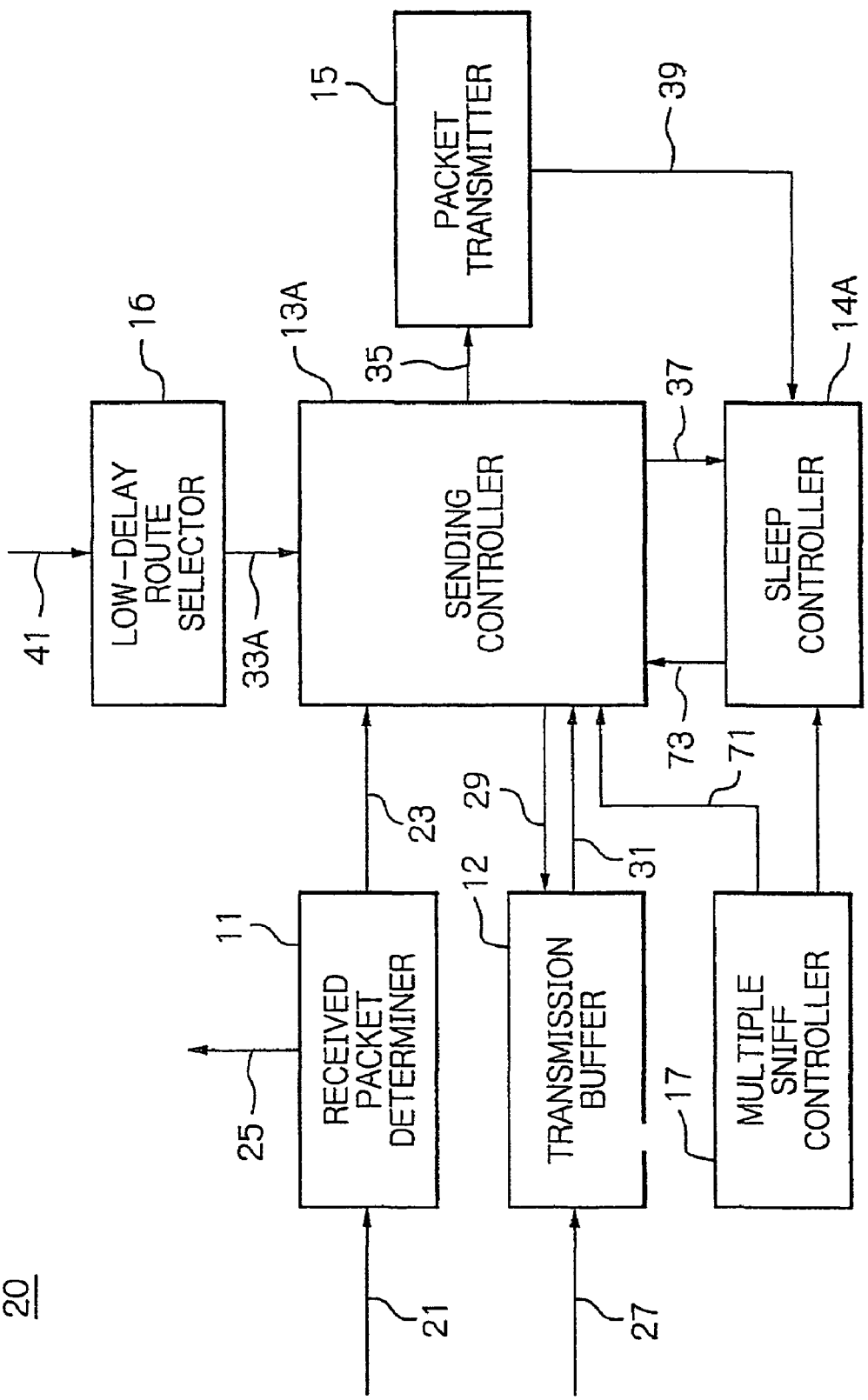
FIG. 6 is a schematic block diagram, like FIG. 1, illustrating the internal functional structure of a node functioning as an intermittent operative communication apparatus according to the alternative embodiment.

FIG. 5 shows the overall structure of the communication system 2 according to the alternative embodiment. FIG. 6 is a block diagram illustrating the internal functional structure of a node 20 according to the alternative embodiment. Like sections or elements as shown in FIG. 1 are given the same or corresponding reference numerals.

The communication system 2 includes at least five nodes 20, specifically 20-1 to 20-5. Each of the nodes 20-1 to 20-5 may have the same structure as the nodes 10 according to the illustrative embodiment shown in and described with reference to FIGS. 1 and 2, except that the node 20 includes a multiple sniff controller 17, which will be described later on.

In the communication system 2, each node 20 (20-1 to 20-5) is connected to form a tree structure as shown in FIG. 5. More specifically, the node 20-1 is positioned on the upper layer of the tree, and the remaining nodes 20-2 to 20-5 connected below to the node 20-1.

With reference to FIG. 6, the node 20 consists of the received packet determiner 11, transmission buffer 12, packet transmitter 15 and low-delay route selector 16, as well as a sending controller 13A, a sleep, controller 14A and a multiple sniff controller 27, which are interconnected as depicted. A repetitive description is omitted on the received packet determiner 11, transmission buffer 12, packet transmitter 15 and low-delay route selector 16, which may be the same as the illustrative embodiment shown in and described with reference to FIG. 1.

The multiple sniff controller 27 is adapted to determine a frequency or interval of sniffing, based on the amount of past traffic, for example, to control the sending controller 13A and sleep controller 14A.

More specifically, the multiple sniff controller 27 records history information on past traffic, such as the number of received packets during the past period of time τ [second]. The number of received packets during the past period of time τ is used as a trigger for such operation that an increase in number of received packets causes an according increase in sniff count per interval T, and on the contrary a decrease in number of received packets will cause the sniff count to accordingly decrease. The minimum sniff count per interval T is set to unity. For example, the identification (ID) representative of the initial sniff timing originally set is defined as sniff 0, and the increased sniff timing is as sniff 1, sniff 2 and soon. In an application where multiple times of sniffing are performed during one interval T, a correspondence table is prepared which indicates which of the nodes 20 returns a response to a start request in specific one of the sniff IDs, thus load sharing being explicitly available.

In the communication system 2, for example, as to the node 20-1, a correspondence is defined in which the node 20-1 receives a response with sniff 0 to the nodes 20-2 and 20-3 that possibly send a packet to the own device 20-1 whereas receiving with sniff 1 for the other nodes 20-4 and 20-5. The list of defined correspondence, or "node list", is notified to the sending controller 13A so that the controller 13A can operate according to the list. This correspondence may randomly be defined in a way in which the number of the nodes assigned to the respective sniff IDs is evenly balanced therebetween. Alternatively, the past traffic condition on each node maybe saved so as to assign the node traffic to respective sniff IDs evenly in balance. Further alternatively, the correspondence may manually be set in advance.

The sending controller 13A, when receiving a control packet 23 for start request, at first uses a node list 71 transferred from the multiple sniff controller 17 and a sniff ID 73 notified by the sleep controller 14A to thereby determine whether to respond to a start request with the current sniff ID. The data of correspondence 71 between the sniff ID and the nodes is provided by the multiple sniff controller 17. If the source of that start request is a node to which a start response is to be returned with the current sniff ID, then a response to the start response is transmitted by the packet transmitter 15. Otherwise, i.e. unless any correspondence is found, no action is taken.

The sleep controller 14A performs sniffing during the operational interval T [second], plural times corresponding to a sniff count notified from the multiple sniff controller 17. The sniff ID is set to "0" in the case of the minimum sniff count, i.e. one. As the sniff count increases, the ID is incremented as 1, 2, 3 and so on. Each time it is the sniff timing, the sending controller 13A is notified of a sniff ID. The sniff timing control may be modified such that the timing is fixed with sniff 0, the other sniff timings correlate with sniff 0 to take a timing resultant from evenly dividing the interval T by a sniff count. Alternatively, provided that the sniff ID is set to a positive integer n, the timing may be set so that the sniff n is to take x seconds after the sniff (n−1). Thus, such a condition may be avoided that a different sniff ID is set to the same sniff timing.

The operation of the communication system 2 will be described below which has the structure described above. The operation of the multiple sniff controller 17 where the sniff count is set to one may be the same as the illustrative embodiment shown in and described with reference to FIG. 1, and therefore repetitive description is refrained from.

If the node 20-1 receives a lot of packets during the past period τ [second] so that the multiple sniff controller 17 has set the sniff count to "2" or more, then the sniff controller 17 notifies the sleep controller 14A of the sniff count. When the sniff count is set to "2", the sending controller 13A is notified of the correspondence of a node to be responded with sniff 0, i.e. nodes 20-2 and 20-3 in the example, with a node to be responded with the ID of sniff 1, e.g. nodes 20-4 and 20-5 and the remaining nodes. The sleep controller 14A, when having received a notice that the sniff count is set to "2", produces a new schedule for the sniff timing of sniff 1 to sniff twice per interval T.

In order that the node 20-2 sends a data packet to the node 20-1, when the node 20-2 repetitively sends a control packet for start request to the node 20-1, the node 20-1 will receive a control packet for start request when it is at the sniff timing. The sleep controller 14A has already notified the sending controller 13A of the sniff ID. Now, when the node 20-1 receives the control packet for start request, the node 20-1 can consult with the correspondence of the source of the control packet with the sniff ID notified by the multiple sniff controller 17 to determine whether or not it is to return a control packet for start response in response to the start request thus received. If that correspondence is appropriate, then a control packet for start response is sent, whereas if inappropriate the start request is ignored. If thus ignored, a control packet for start response will be able to be sent at some of the following sniff timings. As described above, the node 20-2 having received a start response will send a data packet to the node 20-1 to complete the packet transmission.

According to the alternative embodiment, the following advantages may effectively be achieved. The node 10 according to the illustrative embodiment shown in and described with reference to FIGS. 1 and 2 provides one sniff during one interval T, so that it can receive a data packet only from one node, thus no reception from two nodes being allowed during the same interval. In the worst case, even when a collision occurs due to simultaneous transmission from two nodes at a time and the collision can be avoided with carrier sensing, reception from either of the nodes has to be postponed to the next interval, causing a delay to increase accordingly. The node 20 according to the alternative embodiment is, however, adapted to increase the sniff count per interval T depending on the traffic frequency so as to allow two or more packets to be received in the interval T, thus accomplishing an effective load sharing and delay reduction.

Another alternative embodiment of intermittent operative communication apparatus according to the invention will be described by referring to FIG. 7. The intermittent operative communication apparatus according to the other alternative embodiment is also applicable to a wireless communication node.

Figure 7:
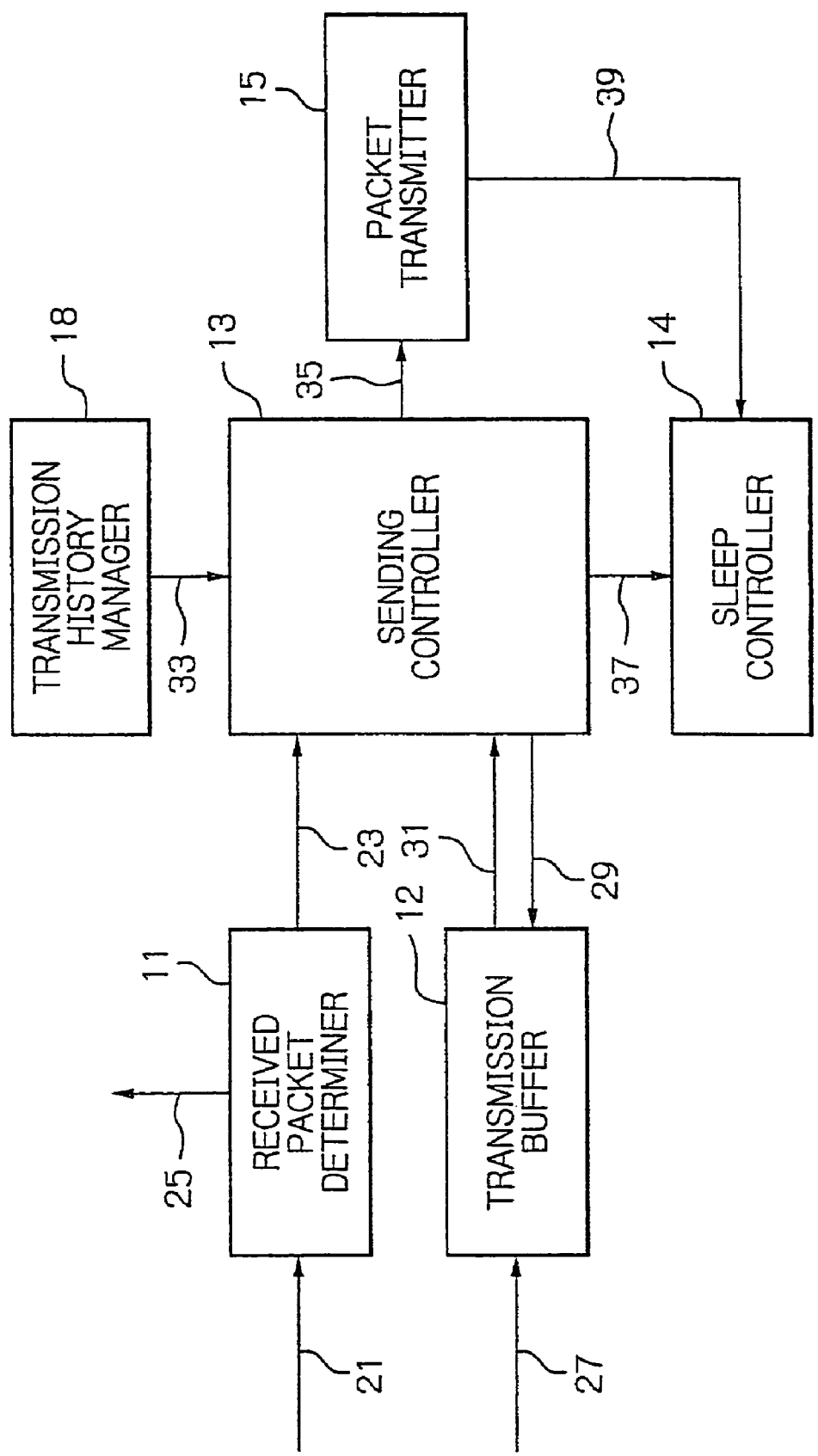
FIG. 7 is also a schematic block diagram illustrating the internal functional structure of a node functioning as an intermittent operative communication apparatus according to another alternative embodiment.

FIG. 7 is a schematic block diagram illustrating the overall structure of a node 30 according to the other alternative embodiment. The communication system applicable to the instant alternative embodiment may be formed by nodes 30 disposed in plural.

The node 30 according to the present alternative embodiment may consist of the received packet determiner 11, transmission buffer 12, sending controller 13, sleep controller 14 and packet transmitter 15, and a transmission history manager 18. The node 30 according to the instant alternative embodiment may be the same as the illustrative embodiment shown in and described with reference to FIG. 1 except that the low-delay route selector 16 of the node 10 in the embodiment shown in FIG. 1 is replaced with the transmission history manager 18. Thus, a description will not repeated on the structural elements other than the transmission history manager 18.

The transmission history manager 18 functions as storing information on the history of past traffic, such as a destination, a transmission count and the priority for packets sent during past time period τ. Based on the information thus stored, the history manager 18 evaluates each node 30 of the network in such a way that destinations to which a larger number of packets or a packet with higher priority have been sent are weighted. The manager 18 designates the address of a node with the highest evaluation to notify the sending controller 13 of the node thus designated as a destination address with low delay.

The present alternative embodiment may operate in the same fashion as the illustrative embodiment shown in FIG. 1 except that the present alternative embodiment may determine a destination address with low delay by means of the transmission history manager 18. A repetitive description on such an operation is therefore avoided.

According to the other alternative embodiment, the node 30 can determine a destination with low delay transmission from a transmission count and a priority based on the information on the traffic history. The illustrative embodiment shown in FIG. 1 determines a low-delay route based on the upper layer processing such as information on transfer routes of the network. In the instant alternative embodiment, however, a low-delay route can reasonably be determined without such upper layer information.

While the present invention has been described with reference to the particular illustrative embodiments, it is not to be restricted by the embodiments. It is to be appreciated that those skilled in the art can change or modify the embodiments without departing from the scope and spirit of the present invention.

For example, in the embodiment shown in and described with reference to FIGS. 1 and 2, the low-delay route selector 16 may be adapted to set in advance a node 10 acting as a destination with low delay. The low-delay route selector 16 may be adapted to update a node 10 acting as a destination with low delay either each time data are sent to other nodes 10 or regularly at a predetermined time interval, thus the timing for the updating would not be restrictive. In addition, the low-delay route selector 16 may take single or multiple number of destination nodes 10 which are to be given low delay.

The nodes according to the illustrative embodiments described above may, alone or in combination, form a wireless communication system, which may further include other types of nodes than the illustrative embodiments described above.

The entire disclosure of Japanese patent application No. 2008-44729 filed on Feb. 26, 2008, including the specification, claims, accompanying drawings and abstract of the disclosure, is incorporated herein by reference in its entirety.

What is claimed is:

1. An intermittent operative communication apparatus for use in a telecommunications system including a plurality of communication devices, said apparatus waiting for receiving data at a predetermined interval and sending data received from a source device among the plurality of communication devices to a receiver device among the plurality of communication devices, said receiver device waiting for data at the predetermined interval, said apparatus comprising:
    a selector for selecting one of the plurality of communication devices as a reference device that has a reference timing at which said reference device waits for receiving data;
    a timing controller for setting a receiving timing at which said apparatus waits for receiving data; and
    a timing estimator to estimate a timing that corresponds to the reference timing of the reference device by using a timing at which a response signal, that is transmitted in response to a signal from the apparatus, is received from said reference device or another timing at which data are sent to said reference device,
    said timing controller setting the receiving timing to be the timing estimated by said timing estimator shifted by a predetermined value.

2. The apparatus according to claim 1, wherein said selector selects said reference device according to a network topology of the telecommunications system, and
    the network topology has a tree structure and said selector selects a receiver device, corresponding to a mother node of said apparatus, as said reference device.

3. The apparatus according to claim 1, wherein said selector uses information on history of said apparatus previously transmitting data to select said reference device.

4. The apparatus according to claim 3, further comprising a wait frequency controller for using the information on the history to control a frequency at which said apparatus waits for receiving data during the predetermined interval.

5. The apparatus according to claim 4, wherein said wait frequency controller sets a plurality of reception wait timings as the frequency in the predetermined interval, said apparatus further comprising:
    a correspondence decision circuit for selecting a plurality of sender communication devices, each of the plurality of reception wait timings corresponding to only one of the selected sender communication devices; and
    a reception controller for allowing data to be received at each respective reception wait timing only from the corresponding sender communication device selected at the respective reception wait timing.

6. The apparatus according to claim 5, wherein to select the corresponding sender communication devices for the respective reception wait timings said correspondence decision circuit uses information on history of said apparatus previously sending or receiving data.

7. A telecommunications system comprising a plurality of communication devices, said devices waiting for receiving data at a predetermined interval and sending data received from a source device among the plurality of communication devices to a receiver device among the plurality of communication devices, said receiver device waiting for data at the predetermined interval, wherein one of the plurality of devices is operative intermittently and comprises:
    a selector for selecting one of the plurality of communication devices as a reference device that has a reference timing at which said reference device waits for receiving data;
    a timing controller for setting a receiving timing at which said device waits for receiving data; and
    a timing estimator to estimate a timing that corresponds to the reference timing of the reference device by using a timing at which a response signal, that is transmitted in response to a signal from the one device, is received from said reference device or another timing at which data are sent to said reference device,
    said timing controller setting the receiving timing to be the timing estimated by said timing estimator shifted by a predetermined value.

8. The system according to claim 7, wherein said selector selects said reference device according to a network topology of said system, and
    the network topology has a tree structure and said selector selects a receiver device, corresponding to a mother node of said one device, as said reference device.

9. The system according to claim 7, wherein said selector uses information on history of said device previously transmitting data to select said reference device.

10. The system according to claim 9, wherein said device further comprises a wait frequency controller for using the information on the history to control a frequency at which said device waits for receiving data during the predetermined interval.

11. The system according to claim 10, wherein said wait frequency controller sets a plurality of reception wait timings as the frequency in the predetermined interval, said device further comprising:
    a correspondence decision circuit for selecting a plurality of sender communication devices each of the plurality of reception wait timings corresponding to only one of the selected sender communication devices; and
    a reception controller for allowing data to be received at each respective reception wait timing only from the corresponding sender communication device selected at the respective reception wait timing.

12. The system according to claim 11, wherein to select the corresponding sender communication devices for respective reception wait timings, said correspondence decision circuit uses information on history of said device previously sending or receiving data.

13. A communication method in an intermittent operative communication apparatus for use in a telecommunications system including a plurality of communication devices, the apparatus waiting for receiving data at a predetermined interval and sending data received from a source device among the plurality of communication devices to a receiver device among the plurality of communication devices, the receiver device waiting for data at the predetermined interval, the apparatus including a selector, a timing controller and a timing estimator said method comprising the steps of:
    selecting, by the selector, one of the plurality of communication devices as a reference device that has a reference timing at which said reference device waits for receiving data;

setting, by the timing controller, a receiving timing at which the apparatus waits for receiving data;

estimating, by the timing estimator, a timing that corresponds to the reference device by using a timing at which a response signal, that is transmitted in response to a signal from the apparatus, is received from the reference device or another timing at which data are sent to the reference device; and setting, by the timing controller, the receiving timing to be the timing estimated by said timing estimator shifted by a predetermined value.

14. The method according to claim 13, further comprising the steps of:

selecting the reference device, by the selector, according to a network topology of the telecommunications system, the network topology having a tree structure; and selecting by the selector a receiver device, corresponding to a mother node of the apparatus, as the reference device.

15. The method according to claim 13, further comprising the step of using, by the selector, information on history of the apparatus previously transmitting data to select the reference device.

16. The method according to claim 15, wherein the apparatus further comprises a wait frequency controller, said method further comprising the step of using by the wait frequency controller the information on the history to control a frequency at which the apparatus waits for receiving data during the predetermined interval.

17. The method according to claim 16, wherein the apparatus further comprises a correspondence decision circuit and a reception controller, said method further comprising the steps of:

setting by the wait frequency controller a plurality of reception wait timings as the frequency in the predetermined interval;

selecting, by the correspondence decision circuit, a plurality of sender communication devices, each of the plurality of reception wait timings corresponding to only one of the selected sender communication devices; and allowing, by the reception controller, data to be received at each respective reception wait timing only from the corresponding sender communication device selected at the respective reception wait timing.

18. The method according to claim 17, further comprising the step of using, by the correspondence decision circuit, information on history of the apparatus previously sending or receiving data to select corresponding sender communication devices for respective reception wait timings.

* * * * *